(12) United States Patent
Wu et al.

(10) Patent No.: US 11,849,156 B2
(45) Date of Patent: Dec. 19, 2023

(54) DATA SHARING METHOD AND DATA SHARING SYSTEM CAPABLE OF CHANGING HARDWARE REGISTRATION IDENTIFICATION CODE

(71) Applicant: BENQ CORPORATION, Taipei (TW)

(72) Inventors: Chen-Chi Wu, Taipei (TW); Chia-Nan Shih, Taipei (TW); Chin-Fu Chiang, Taipei (TW); Chuang-Wei Wu, Taipei (TW); Jung-Kun Tseng, Taipei (TW)

(73) Assignee: BenQ Corporation, Taipei (TW)

( * ) Notice: Subject to any disclaimer, the term of this patent is extended or adjusted under 35 U.S.C. 154(b) by 93 days.

(21) Appl. No.: 17/584,340

(22) Filed: Jan. 25, 2022

(65) Prior Publication Data

US 2022/0368955 A1    Nov. 17, 2022

(30) Foreign Application Priority Data

May 11, 2021    (TW) .................................. 110116884

(51) Int. Cl.
*H04N 21/2187*    (2011.01)
*H04N 21/2747*    (2011.01)

(52) U.S. Cl.
CPC ..... *H04N 21/2187* (2013.01); *H04N 21/2747* (2013.01)

(58) Field of Classification Search
CPC ........................ H04N 21/2187; H04N 21/2747
See application file for complete search history.

(56) References Cited

U.S. PATENT DOCUMENTS

| | | | |
|---|---|---|---|
| 2012/0127197 A1* | 5/2012 | Sakayori | G06F 3/0346 345/619 |
| 2016/0066159 A1* | 3/2016 | Cronin | H04W 4/30 455/456.3 |

* cited by examiner

*Primary Examiner* — Alazar Tilahun

(57) ABSTRACT

A data sharing method includes providing a receiver and at least one transmitter, changing a first hardware registration identification code of the at least one transmitter to a second hardware registration identification code of a virtual camera device corresponding to at least one communication software program by the receiver, and using the virtual camera device for converting at least one image data signal transmitted from the at least one transmitter to video stream data supported by the at least one communication software program after the receiver receives the at least one image data signal.

20 Claims, 3 Drawing Sheets

DATA SHARING METHOD AND DATA SHARING SYSTEM CAPABLE OF CHANGING HARDWARE REGISTRATION IDENTIFICATION CODE

BACKGROUND OF THE INVENTION

1. Field of the Invention

The present invention relates to a data sharing method and a data sharing system, and more particularly, a data sharing method and a data sharing system capable of changing hardware registration identification code by using virtual camera devices.

2. Description of the Prior Art

With the rapid development of science and technology, various projector systems and conference reporting systems have been adopted in our daily life. The conference report system can be integrated with a projector system for increasing the operational convenience of a presenter when data is presented. Currently, the conference reporting systems use wireless or wired communications for transmitting data to a display device. The data communications methods can be categorized into two modes. Ina first mode, a specific software program has to be installed in computers operated by members participating in a conference meeting. The computer can identify several hardware components such as a hard disk, a universal serial bus (USB), and a CD-ROM device. Then, data saved in previously mentioned physical or virtual storage devices can be transmitted to a screen or display device through a wireless network. In a second mode, the computers operated by the members participating in the conference meeting can be linked to transmitters. The transmitters are linked to the screen or display device through a receiver. Therefore, after the computers are linked to transmitters, the data of the computer can be displayed on the screen or display device through the receiver. In recent years, conference reporting systems can use wireless communications technologies for increasing operational efficiency.

Security management of the USB transmission port is an important issue of design. A reason is that a data access function of the USB has high security risk of data leakage when information of the USB transmission port is attacked by hackers. In the field of information security management, the most effective and commonly used method is to turn off the USB data access function for avoiding causing data leakage. In other words, the USB transmission port only retains 5V (Volt)/0.5 A (Ampere) and 5V/0.9 A formats of power supply functions. However, in an operating system (OS) of a general computer, when the USB transmission port is connected to the computer, the computer can communicate with the USB transmission port by using Human Interface Device (HID) commands. Then, the computer can identify hardware specifications and data formats of the USB transmission port. The hardware specifications and data formats of the USB transmission port can be checked by a device manager interface. However, since the HID commands can be transmitted from the USB transmission port to the computer, the information security of the HID commands is still questioned. In other words, when the USB transmission port is connected to the computer, since the HID command can be regarded as an intrusive input signal, information security risk of data leakage is still a problem.

SUMMARY OF THE INVENTION

In an embodiment of the present invention, a data sharing method is disclosed. The data sharing method comprises providing a receiver and at least one transmitter, changing a first hardware registration identification code of the at least one transmitter to a second hardware registration identification code of a virtual camera device corresponding to at least one communication software program by the receiver, and using the virtual camera device for converting at least one image data signal transmitted from the at least one transmitter to video stream data supported by the at least one communication software program after the receiver receives the at least one image data signal.

In another embodiment of the present invention, a data sharing system is disclosed. The data sharing system comprises at least one transmitter, and a receiver coupled to the at least one transmitter. The receiver changes a first hardware registration identification code of the at least one transmitter to a second hardware registration identification code of a virtual camera device corresponding to at least one communication software program. The receiver uses the virtual camera device for converting at least one image data signal transmitted from the at least one transmitter to video stream data supported by the at least one communication software program after the receiver receives the at least one image data signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
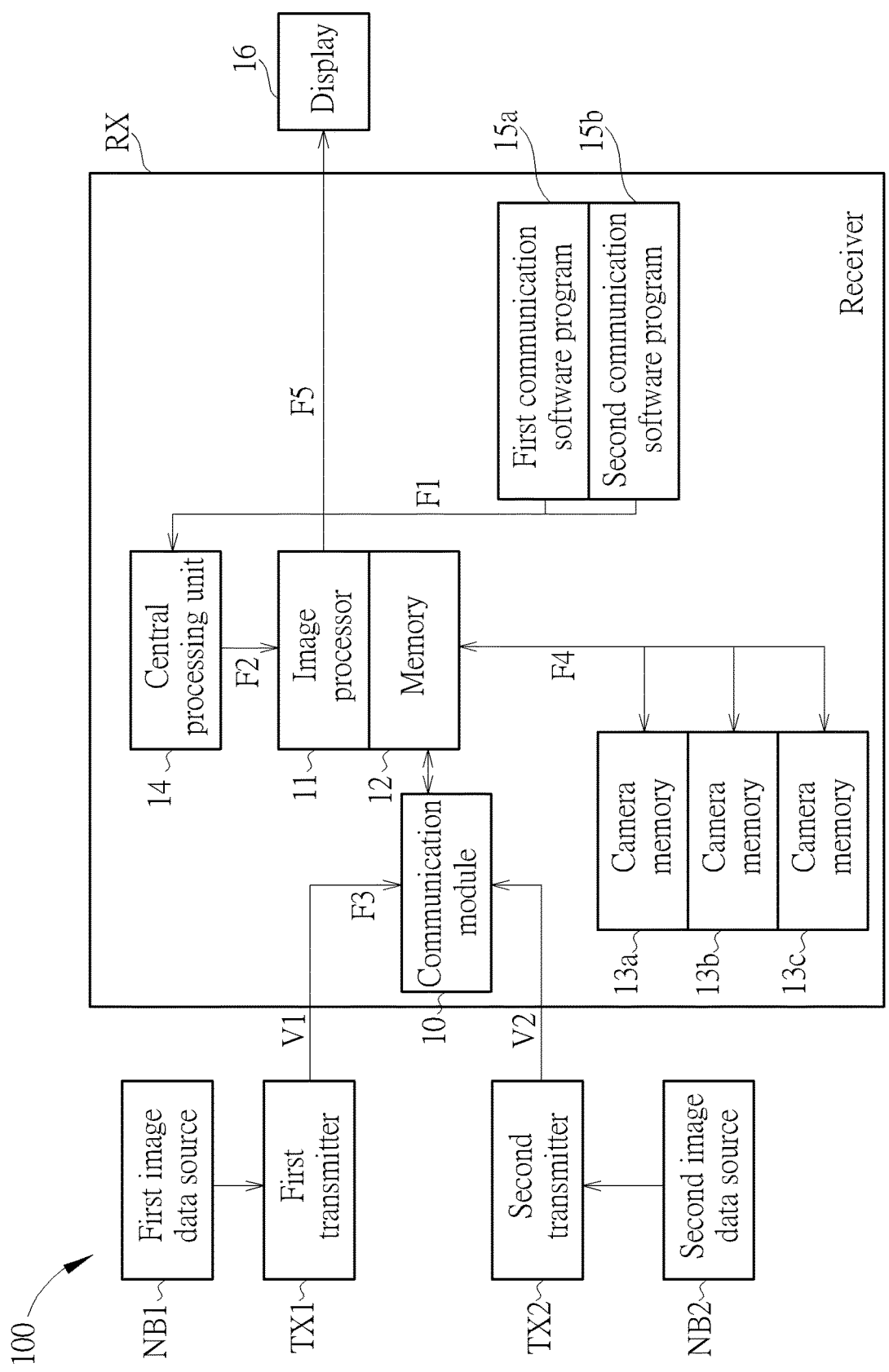
FIG. 1 is a block diagram of a data sharing system according to an embodiment of the present invention.

FIG. 1 is a block diagram of a data sharing system 100 according to an embodiment of the present invention. The data sharing system 100 includes a first transmitter TX1, a receiver RX, and a display 16. The data sharing system 100 can include a plurality of transmitters, such as the first transmitter TX1 and a second transmitter TX2. The receiver RX can wirelessly communicate with the first transmitter TX1 and the second transmitter TX2, such as using Wi-Fi network for commutating data with the first transmitter TX1 and the second transmitter TX2. The first transmitter TX1 is coupled to a first image data source NB1. The second transmitter TX2 is coupled to a second image data source NB2. The first image data source NB1 and the second image data source NB2 can be two computers. The first image data source NB1 and the second image data source NB2 can install operating systems. In the data sharing system 100, the receiver RX can change a first hardware registration identification code of the at least one transmitter to a second hardware registration identification code of a virtual camera device corresponding to at least one communication software program. For example, when the first transmitter TX1 is coupled to the first image data source NB1, the receiver RX can forcibly change a hardware registration identification code of the transmitter originally displayed on the first image data source NB1 (i.e., the computer) to a hardware registration identification code of a virtual camera device corresponding to a certain software program. In other words, hardware data of the transmitter displayed on the device manager of the first image data source NB1 is already changed. Therefore, when the hardware registration identification code of the virtual camera device (i.e., such as: USB 2.0 HD UVC Webcam) is displayed on an interface of the device manager, the risk of data leakage can be reduced. Further, the receiver RX can use the virtual camera device for converting at least one image data signal transmitted from the at least one transmitter to video stream data supported by the at least one communication software program after the receiver RX receives the at least one image data signal. For example, the receiver RX can install Skype software program. When the receiver RX receives at least one image data signal transmitted from the first image data source NB1 through the first transmitter TX1, the virtual camera device can be used for converting the at least one image data signal into video streaming data supported by the corresponding Skype communication software program (i.e., such as remote desktop sharing function or a video function). Details of the data sharing system 100 are illustrated later.

In the data sharing system 100, the receiver RX includes a communication module 10, an image processor 11, a memory 12, a camera memory 13a to a camera memory 13c, a central processing unit 14, a first communication software program 15a, and a second communication software program 15b. The structure of the receiver RX can be reasonably changed. For example, the number of camera memories and the number of communication software programs installed in the receiver RX can be reasonably changed. In the data sharing system 100, the receiver RX can generate data of at least one virtual camera device to the memory 12 according to at least one communication software program. The at least one virtual camera device can transmit the video stream data to a communication platform corresponding to the at least one communication software program. Details are illustrated below. In the data sharing system 100, the first communication software program 15a and the second communication software program 15b can be two different communication software programs. The first communication software program 15a and the second communication software program 15b can drive the central processing unit 14 for generating command signals through the path F1. The command signal generated by the central processing unit 14 can be transmitted to the image processor 11 through the path F2. Then, the communication module 10 can receive the image data signal V1 transmitted from the first transmitter TX1 and the image data signal V2 transmitted from the second transmitter TX2 through the path F3. Then, the image processor 11 can read the virtual camera device data stored in the camera memories 13a to 13c through the path F4 and can further buffer the virtual camera device data in the memory 12. The communication module 10 can communicate with the image processor 11 for transmitting the image data signal V1 and the image data signal V2 to the image processor 11. The image processor 11 can be a graphics card or a graphics chip. The image processor 11 can read the virtual camera device data from the memory 12 can call the central processing unit 14 for re-encoding the image data signal V1 and the image data signal V2. The re-encoded image data signals generated by re-encoding the image data signal V1 and the image data signal V2 are compatible with a communication platform corresponding to at least one communication software program. For example, the first communication software program 15a is "Skype". The Skype platform supports a video sharing mode and a desktop sharing mode. The second communication software program 15b is "Zoom". The Zoom platform supports the video sharing mode and the desktop sharing mode. After the hardware registration identification codes of the image data signal V1 and the image data signal V2 are modified by using the virtual camera device, they can be compatible with the remote desktop sharing mode and the video sharing mode of the first communication software program 15a and/or the second communication software program 15b. In other words, for the data sharing system 100, no physical "camera device" is required. The data sharing system 100 can use the receiver RX for forcibly changing a hardware registration identification code of at least one transmitter to another hardware registration identification code of the virtual camera device supported by at least one communication program. Therefore, the data sharing system 100 can provide high information security in conjunction with high operating convenience. Further, in the data sharing system 100, a user can manually set the first transmitter TX1 and/or the second transmitter TX2 as at least one virtual camera device through an interface or a button (hot key) of the receiver RX. Alternatively, the first transmitter TX1 and/or the second transmitter TX2 may request the receiver RX for setting itself as a virtual camera device.

In the data sharing system 100, the first image data source NB1 is coupled to a first transmitter TX1 of the at least one transmitter for generating the first image data signal V1. Further, the receiver RX can identify the first transmitter TX1, such as using an identification code, a name, or an IP address. The first image data source NB1 transmits the first image data signal to the receiver RX through the first transmitter TX1. The receiver RX can execute the first communication software program 15a for converting the first image data signal V1 to the video stream data supported by the first communication software program 15a by using the first virtual camera device (i.e., virtual camera data saved in the camera memory 13a) of at least one virtual camera device. The at least one virtual camera device is controlled by the receiver RX. The data conversion process previously mentioned can be regarded as a one-to-one conversion process. In other words, the first image data signal V1 transmitted from the first image data source NB1 can be converted into the corresponding video data stream supported by the first communication software program 15a by using the first virtual camera device.

In the data sharing system 100, the first image data source NB1 is coupled to a first transmitter TX1 of the at least one transmitter for generating the first image data signal V1. Further, the receiver RX can identify the first transmitter TX1, such as using the identification code, the name, or the IP address. The first image data source NB1 can transmit the first image data signal V1 to the receiver RX through the first transmitter TX1. After the receiver RX executes the first communication software program 15a and the second communication software program 15b, the receiver RX can convert the first image data signal V1 to the video stream data supported by the first communication software program 15a and convert the first image data signal V1 to the video stream data supported by the second communication software program 15b by using the first virtual camera device and/or the second camera device (i.e., virtual camera data saved in the camera memory 13a and/or the camera memory 13b) of at least one virtual camera device. The at least one virtual camera device is controlled by the receiver RX. The data conversion process previously mentioned can be regarded as a one-to-two conversion process. In other words, the first image data signal V1 transmitted from the first image data source NB1 can be converted into the corresponding video data stream supported by the first communication software program 15a and the corresponding video data stream supported by the second communication software program 15b by using the first virtual camera device and/or the second camera device.

In the data sharing system 100, the first image data source NB1 is coupled to a first transmitter TX1 of the at least one transmitter for generating the first image data signal V1. Further, the second image data source NB2 is coupled to a second transmitter TX2 of the at least one transmitter for generating a second image data signal V2. The receiver RX can identify the first transmitter TX1 and the second transmitter TX2. The first image data source NB1 transmits the first image data signal V1 to the receiver RX through the first transmitter TX1. The second image data source NB2 transmits the second image data signal V2 to the receiver RX through the second transmitter TX2. The receiver RX executes the first communication software program 15a for converting the first image data signal V1 to the video stream data supported by the first communication software program 15a and converting the second image data signal V2 to the video stream data supported by the first communication software program 15a by using the first virtual camera device and/or the second camera device (i.e., virtual camera data saved in the camera memory 13a and/or the camera memory 13b) of at least one virtual camera device. The data conversion process previously mentioned can be regarded as a two-to-one conversion process. In other words, the first image data signal V1 transmitted from the first image data source NB1 and the second image data signal V2 transmitted from the second image data source NB2 can be converted into the corresponding video data streams supported by the first communication software program 15a by using the first virtual camera device and/or the second camera device.

In the data sharing system 100, the first image data source NB1 is coupled to a first transmitter TX1 of the at least one transmitter for generating the first image data signal V1. Further, the second image data source NB2 is coupled to a second transmitter TX2 of the at least one transmitter for generating the second image data signal V2. The receiver RX can identify the first transmitter TX1 and the second transmitter TX2. The first image data source NB1 transmits the first image data signal V1 to the receiver RX through the first transmitter TX1. The second image data source NB2 transmits the second image data signal V2 to the receiver RX through the second transmitter TX2. The receiver RX executes the first communication software program 15a and the second communication software program 15b for converting the first image data signal V1 to the video stream data supported by the first communication software program 15a and converting the second image data signal V2 to the video stream data supported by the second communication software program 15b by using the first virtual camera device and/or the second camera device (i.e., virtual camera data saved in the camera memory 13a and/or the camera memory 13b) of at least one virtual camera device. The data conversion process previously mentioned can be regarded as a two-to-two conversion process. In other words, the first image data signal V1 transmitted from the first image data source NB1 can be converted into the corresponding video data stream supported by the first communication software program 15a by using the first virtual camera device and/or the second camera device. Similarly, the second image data signal V2 transmitted from the second image data source NB2 can be converted into the corresponding video data stream supported by the second communication software program 15b by using the first virtual camera device and/or the second camera device.

Further, the first transmitter TX1 and/or the second transmitter TX2 can be switched to perform various operation modes. For example, the first transmission device TX1 and/or the second transmission device TX2 can perform Extended Display Identification Data (EDID) mode for supporting various audio and video transmission ports, such as a High-Definition Multimedia Interface (HDMI) port, a Universal Serial Bus (USB) port, or a USB-Type C port. After the communication module 10 demodulates packets of media data transmitted from the first transmitter TX1 and/or the second transmitter TX2, compressed media data can be temporarily buffered in the camera memories 13a to 13c. Then, the image processor 11 can decompress the compressed media data for performing an image synthesis process. Alternatively, after the communication module 10 demodulates packets of the media data transmitted from the first transmitter TX1 and/or the second transmitter TX2, the image processor 11 can directly decompress the compressed media data for performing an image synthesis process. Then, the decompressed media data can be saved in the camera memories 13a to 13c. The first transmitter TX1 and/or the second transmitter TX2 can perform a universal serial bus (USB) mode. The first transmitter TX1 and/or the second transmitter TX2 can receive images of the first image source NB1 and/or the second image source NB2 via the USB port. Then, the first transmitter TX1 and/or the second transmitter TX2 can generate wireless video and audio packets. In general, if the communication software program is temporarily disabled, the communication module 10 can demodulate the packets of media data and then temporarily buffer the compressed media data in the memory 12 of the image processor 11. Then, the image processor 11 can directly decompress the compressed media data for performing the image synthesis process.

Figure 2:
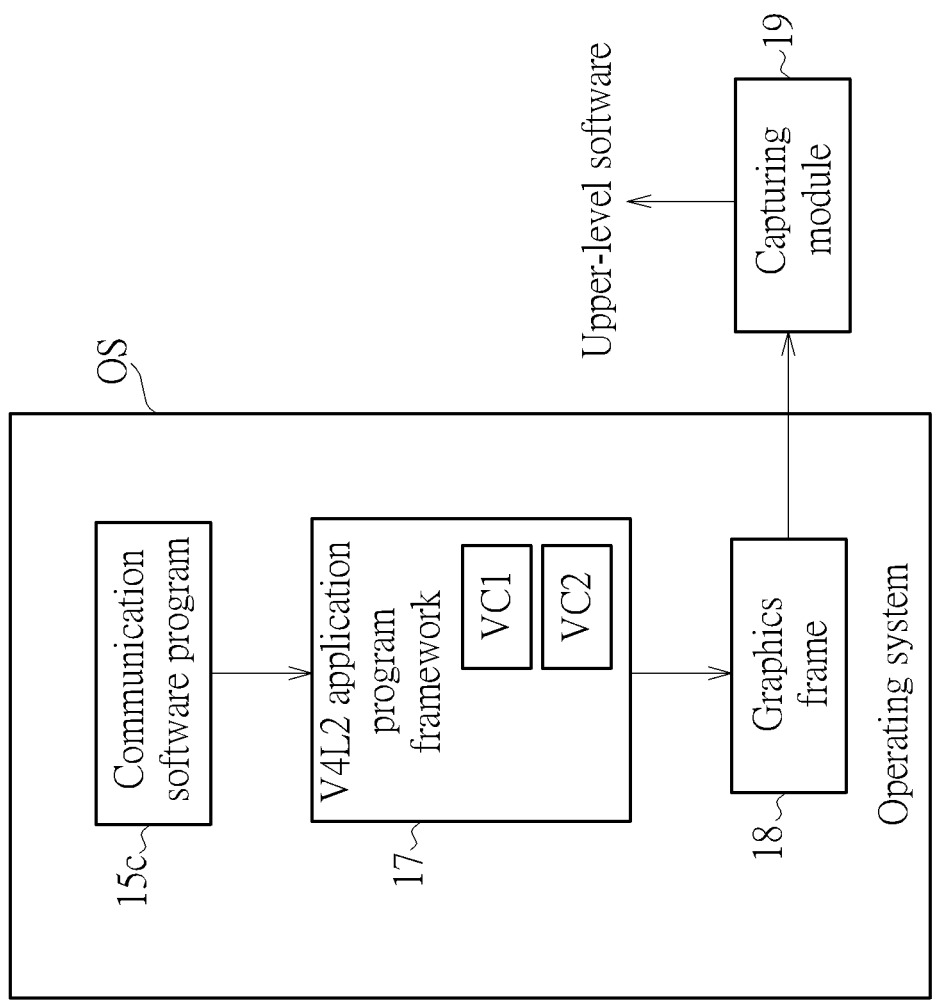
FIG. 2 is an illustration of executing an operating system of the receiver of the data sharing system in FIG. 1

FIG. 2 is an illustration of executing an operating system OS of the receiver RX of the data sharing system 100. The operating system OS can be installed into the receiver RX, such as Linux. The operating system OS comprises a communication software program 15c, an image capturing and device output framework (i.e., say "V4L2 application program framework 17 under Linux OS"), and a graphics frame 18. The receiver RX can execute the communication software program 15c of the operating system OS. After the communication software program 15c is executed, the receiver RX can call the image capturing and device output framework (V4L2 application program framework 17) of the operating system OS for generating at least one virtual camera device VC1 to VC2 and can save data of the at least one virtual camera device VC1 to VC2 to a memory 12 of the image processor 11. Then, the graphics frame 18 can use the virtual camera devices VC1 and VC2 for converting the image data signal. The receiver RX can forcibly change the hardware registration identification code of the transmitter originally displayed on the device manager to the hardware registration identification code of the virtual camera device corresponding to a certain communication software program. Therefore, the image data signal compatible with the communication software program 15c can be accessed by the image capturing module 19. For example, the image capturing module 19 can be a module capable of performing a computer desktop snapshot function or a video recording function. The image capturing module 19 can transmit data to upper-level software. Therefore, the communication software program 15c can provide various services to the user. For example, the receiver RX supports a video sharing mode and a desktop sharing mode. The receiver RX uses at least one virtual camera device for converting the at least one image data signal to the video stream data supported by the at least one communication software program under the video sharing mode. The receiver RX uses a graphics framework for converting the video stream data to screen snapshot data supported by the at least one communication software program under the desktop sharing mode. In other words, regardless of a dynamic image display screen under the video sharing mode or a static image display screen under the desktop sharing mode, the receiver RX can convert at least one image data signal to video stream data compatible with at least one communication software program. Therefore, the data sharing system 100 can provide high operating convenience.

In the data sharing system 100, an image partitioning function can be introduced. The data sharing system 100 can introduce a plurality of image data sources. The plurality of image data sources is coupled to the at least one transmitter for generating a plurality of image data signals. The plurality of image data signals are transmitted to the receiver RX through the at least one transmitter. Further, the receiver RX can execute at least one communication software program for generating at least one virtual camera device. The receiver RX can execute an image partitioning process for composting at least one image transmitted from the at least one transmitter after the at least one image data signal is converted to the video stream data supported by the at least one communication software program by using the virtual camera device of the at least one virtual camera device. In other words, when the plurality of image data sources (i.e., computers) are coupled to the receiver RX, the receiver RX can be compatible with the output image data signals of computers having at least one communication software program. Further, the receiver RX can execute the image partitioning process for composting at least one image outputted from the computers. Therefore, when the data sharing system 100 is applied to a multi-party conference, the efficiency of a meeting progress can be increased.

Further, the "communication software program" previously mentioned can be any communication software program capable of performing a bi-directional communication function of media data. The communication software program has its communication platform. Therefore, the receiver RX can transmit the video stream data to the communication platform corresponding to the at least one communication software program for sharing the video stream data with the user through the communication platform.

Figure 3:
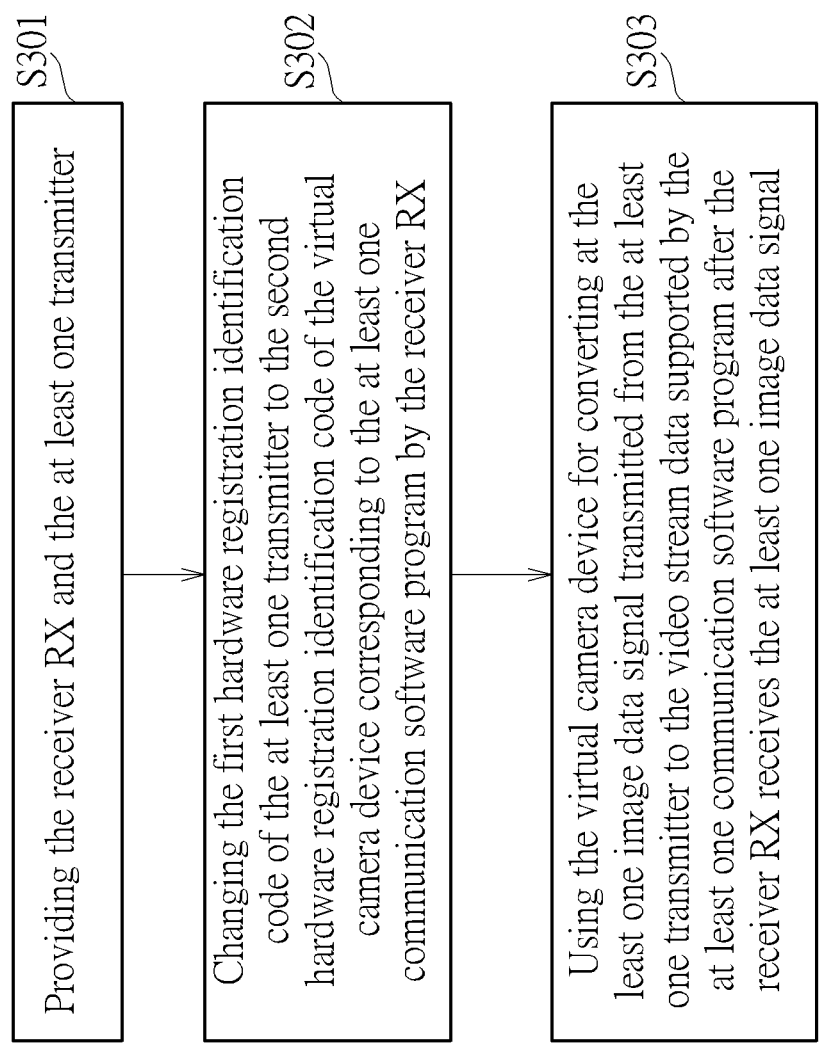
FIG. 3 is a flow chart of performing a data sharing method by the data sharing system in FIG. 1.

FIG. 3 is a flow chart of performing a data sharing method by the data sharing system 100. The data sharing method includes step S301 to step S303. Step S301 to step S303 are illustrated below.

step S301: providing the receiver RX and the at least one transmitter;
step S302: changing the first hardware registration identification code of the at least one transmitter to the second hardware registration identification code of the virtual camera device corresponding to the at least one communication software program by the receiver RX;
step S303: using the virtual camera device for converting at the least one image data signal transmitted from the at least one transmitter to the video stream data supported by the at least one communication software program after the receiver RX receives the at least one image data signal.

Details of step S301 to step S303 are previously illustrated. Thus, they are omitted here. In the data sharing system 100, the receiver RX can forcibly change the hardware registration identification code of the transmitter originally displayed on the image data source to the hardware registration identification code of the virtual camera device corresponding to a certain software program. Therefore, for the image data source (i.e., computer), since the hardware registration identification code of the transmitter is changed, information security can be improved.

To sum up, the present invention illustrates a data sharing method and a data sharing system. The receiver of the data sharing system can generate virtual camera data. Therefore, the receiver can forcibly change the hardware registration identification code of the transmitter. Therefore, two advantages are introduced to the data sharing system. First, since the hardware registration code of the transmitter is changed, the information security can be increased. Second, the hardware registration identification code of the transmitter is compatible with at least one virtual camera device of the communication software program. In other words, regardless of a dynamic image display screen under the video sharing mode or a static image display screen under the desktop sharing mode, the receiver can convert at least one image data signal to video stream data compatible with at least one communication software program. Therefore, the data sharing system can provide high operating convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A data sharing method comprising:
providing a receiver and at least one transmitter;
coupling the at least one transmitter to the receiver;
requesting the receiver by the at least one transmitter for changing a first hardware registration identification code of the at least one transmitter to a second hardware registration identification code;
setting the at least one transmitter as a virtual camera device by the receiver after the first hardware registration identification code of the at least one transmitter is changed to the second hardware registration identification code; and
using the virtual camera device for converting at least one image data signal transmitted from the at least one transmitter to video stream data supported by the at least one communication software program after the receiver receives the at least one image data signal;
wherein the second hardware registration identification code corresponds to the virtual camera device operated under at least one communication software program by the receiver.

2. The method of claim 1, further comprising:
generating data of at least one virtual camera device to a memory by the receiver according to the at least one communication software program; and transmitting the video stream data from the at least one virtual camera device to a communication platform corresponding to the at least one communication software program.

3. The method of claim 1, further comprising:
generating a first image data signal by a first image data source;
identifying a first transmitter by the receiver;
transmitting the first image data signal from the first image data source to the receiver through the first transmitter; and
executing a first communication software program for converting the first image data signal to video stream data supported by the first communication software program by using a first virtual camera device of at least one virtual camera device controlled by the receiver.

4. The method of claim 1, further comprising:
generating a first image data signal by a first image data source;
identifying a first transmitter by the receiver;
transmitting the first image data signal from the first image data source to the receiver through the first transmitter;
executing a first communication software program and a second communication software program for converting the first image data signal to video stream data supported by the first communication software program and converting the first image data signal to video stream data supported by the second communication software program by using a first virtual camera device and/or a second virtual camera device of at least one virtual camera device controlled by the receiver.

5. The method of claim 1, further comprising:
generating a first image data signal by a first image data source;
generating a second image data signal by a second image data source;
identifying a first transmitter and a second transmitter by the receiver; and
executing a first communication software program for converting the first image data signal to video stream data supported by the first communication software program and converting the second image data signal to video stream data supported by the first communication software program by using a first virtual camera device and/or a second virtual camera device of at least one virtual camera device controlled by the receiver.

6. The method of claim 1, further comprising:
generating a first image data signal by a first image data source;
generating a second image data signal by a second image data source;
identifying a first transmitter and a second transmitter by the receiver; and
executing a first communication software program and a second communication software program for converting the first image data signal to video stream data supported by the first communication software program and converting the second image data signal to video stream data supported by the second communication software program by using a first virtual camera device and/or a second virtual camera device of at least one virtual camera device controlled by the receiver.

7. The method of claim 1, further comprising:
installing an operating system (OS) of the receiver;
executing a communication software program of the operating system;
calling an image capturing and device output framework of the operating system for generating at least one virtual camera device and saving data of the at least one virtual camera device to a memory after the communication software program is executed; and
transmitting the at least one image data signal to the virtual camera device for converting the at least one image data signal by using the image capturing and device output framework.

8. The method of claim 1, further comprising:
generating a plurality of image data signals by a plurality of image data sources;
transmitting the plurality of image data signals to the receiver through the at least one transmitter;
executing at least one communication software program for generating at least one virtual camera device; and
executing an image partitioning process for compositing at least one image transmitted from the at least one transmitter after the at least one image data signal is converted to the video stream data supported by the at least one communication software program by using the virtual camera device controlled by the receiver.

9. The method of claim 1, further comprising:
transmitting the video stream data from the receiver to a communication platform corresponding to the at least one communication software program for sharing the video stream data with a user through the communication platform.

10. The method of claim 1, wherein the receiver supports a video sharing mode and a desktop sharing mode, the receiver uses at least one virtual camera device for converting the at least one image data signal to the video stream data supported by the at least one communication software program under the video sharing mode, and the receiver uses a graphics framework for converting the video stream data to screen snapshot data supported by the at least one communication software program under the desktop sharing mode.

11. A data sharing system comprising:
at least one transmitter; and
a receiver coupled to the at least one transmitter;
wherein after the receiver is coupled to the at least one transmitter, the at least one transmitter requests the receiver for changing a first hardware registration identification code of the at least one transmitter to a second hardware registration identification code, the receiver sets the at least one transmitter as a virtual camera device after the first hardware registration identification code of the at least one transmitter is changed to the second hardware registration identification code, the receiver uses the virtual camera device for converting at least one image data signal transmitted from the at least one transmitter to video stream data supported by the at least one communication software program after the receiver receives the at least one image data signal, and the second hardware registration identification code corresponds to the virtual camera device operated under at least one communication software program by the receiver.

12. The system of claim 11, wherein the receiver comprises a memory, the receiver generates data of at least one virtual camera device to the memory according to the at least one communication software program, and the at least one virtual camera device transmits the video stream data to a communication platform corresponding to the at least one communication software program.

13. The system of claim 11, further comprising:
a first image data source coupled to a first transmitter of the at least one transmitter and configured to generate a first image data signal;
wherein the receiver identifies the first transmitter, the first image data source transmits the first image data signal to the receiver through the first transmitter, the receiver executes a first communication software program for converting the first image data signal to video stream data supported by the first communication software program by using a first virtual camera device of at least one virtual camera device, and the at least one virtual camera device is controlled by the receiver.

14. The system of claim 11, further comprising:
a first image data source coupled to a first transmitter of the at least one transmitter and configured to generate a first image data signal;
wherein the receiver identifies the first transmitter, the first image data source transmits the first image data signal to the receiver through the first transmitter, the receiver executes a first communication software program and a second communication software program for converting the first image data signal to video stream data supported by the first communication software program and converting the first image data signal to video stream data supported by the second communication software program by using a first virtual camera device and/or a second camera device of at least one virtual camera device, and the at least one virtual camera device is controlled by the receiver.

15. The system of claim 11, further comprising:
a first image data source coupled to a first transmitter of the at least one transmitter and configured to generate a first image data signal; and
a second image data source coupled to a second transmitter of the at least one transmitter and configured to generate a second image data signal;
wherein the receiver identifies the first transmitter and the second transmitter, the first image data source transmits the first image data signal to the receiver through the first transmitter, the second image data source transmits the second image data signal to the receiver through the second transmitter, the receiver executes a first communication software program for converting the first image data signal to video stream data supported by the first communication software program and converting the second image data signal to video stream data supported by the first communication software program by using a first virtual camera device and/or a second camera device of at least one virtual camera device, and the at least one virtual camera device is controlled by the receiver.

16. The system of claim 11, further comprising:
a first image data source coupled to a first transmitter of the at least one transmitter and configured to generate a first image data signal;
a second image data source coupled to a second transmitter of the at least one transmitter and configured to generate a second image data signal;
wherein the receiver identifies the first transmitter and the second transmitter, the first image data source transmits the first image data signal to the receiver through the first transmitter, the second image data source transmits the second image data signal to the receiver through the second transmitter, the receiver executes a first communication software program and a second communication software program for converting the first image data signal to video stream data supported by the first communication software program and converting the second image data signal to video stream data supported by the second communication software program by using a first virtual camera device and/or a second camera device of at least one virtual camera device, and the at least one virtual camera device is controlled by the receiver.

17. The system of claim 11, wherein an operating system (OS) is installed into the receiver, the receiver executes a communication software program of the operating system, the receiver calls an image capturing and device output framework of the operating system for generating at least one virtual camera device and saves data of the at least one virtual camera device to a memory after the communication software program is executed.

18. The system of claim 11, further comprising:
a plurality of image data sources coupled to the at least one transmitter and configured to generate a plurality of image data signals;
wherein the plurality of image data signals are transmitted to the receiver through the at least one transmitter, the receiver executes at least one communication software program for generating at least one virtual camera device, and the receiver executes an image partitioning process for compositing at least one image transmitted from the at least one transmitter after the at least one image data signal is converted to the video stream data supported by the at least one communication software program by using the virtual camera device of the at least one virtual camera device.

19. The system of claim 11, wherein the receiver transmits the video stream data to a communication platform corresponding to the at least one communication software program for sharing the video stream data with a user through the communication platform.

20. The system of claim 11, wherein the receiver supports a video sharing mode and a desktop sharing mode, the receiver uses at least one virtual camera device for converting the at least one image data signal to the video stream data supported by the at least one communication software program under the video sharing mode, and the receiver uses a graphics framework for converting the video stream data to screen snapshot data supported by the at least one communication software program under the desktop sharing mode.

* * * * *